Patented Apr. 3, 1951

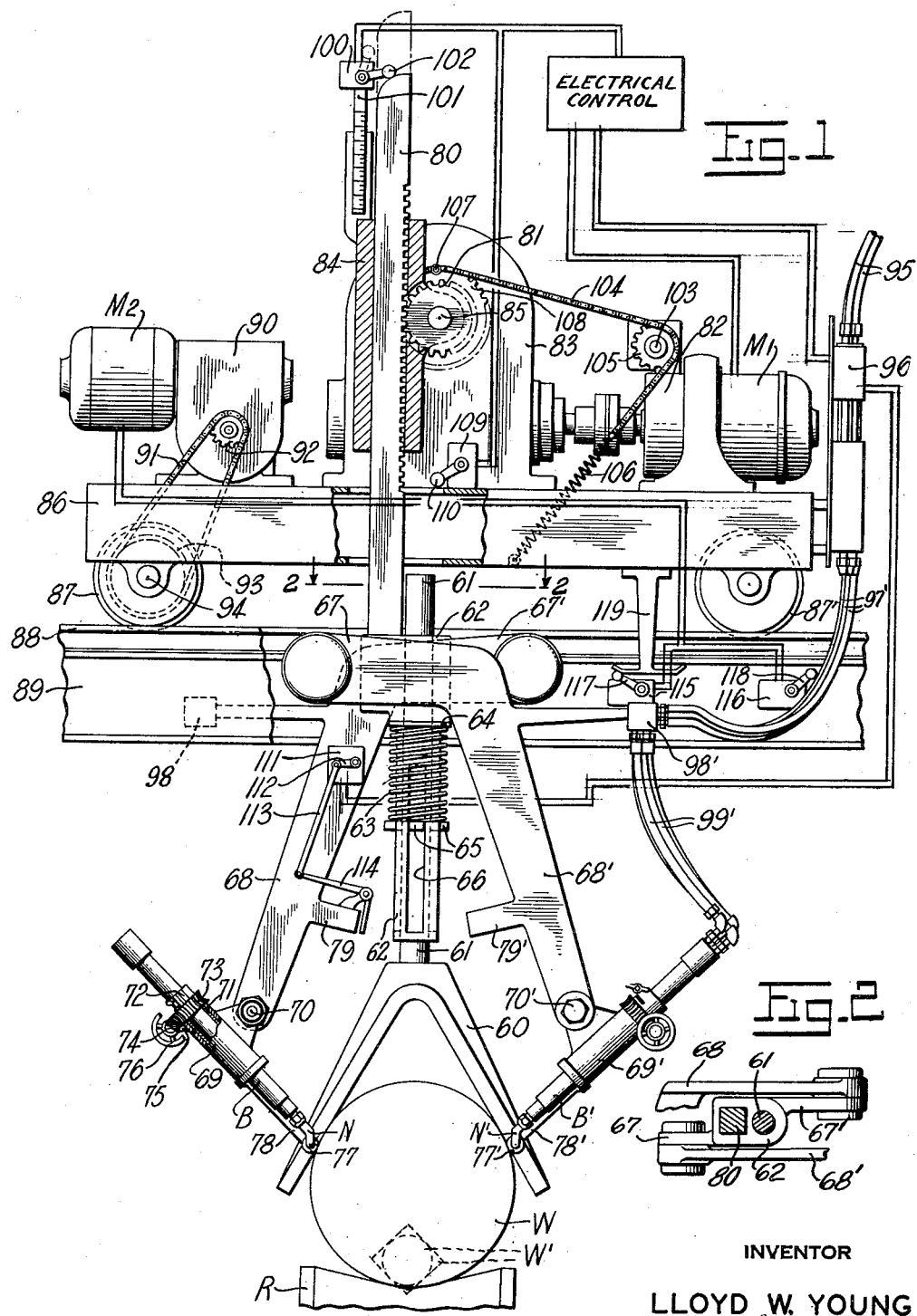

2,547,191

UNITED STATES PATENT OFFICE 2,547,191

METHOD AND APPARATUS FOR CUTTING FERROUS METAL BAR STOCK

Lloyd W. Young, Elizabeth, N. J., assignor to The Linde Air Products Company, a corporation of Ohio Original application November 7, 1939, Serial No. 303,188. Divided and this application February 25, 1944, Serial No. 523,856

13 Claims. (Cl. 148—9.6)

The invention relates to the art of thermochemically cutting metals and more particularly to a method of rapidly and efficiently cutting ferrous metal bar stock such as round or rectangular steel billets by means of gas-cutting blowpipes and to novel apparatus for practicing such method.

This application is a division of my copending application Serial No. 303,188, filed November 7, 1939, now abandoned.

Gas-cutting blowpipes, particularly those of the oxyacetylene type, provide an efficient means for cutting metal stock and in steel mills it has been proposed to use such means for removing scrap ends from billets or blooms, and for cutting heavy rounds or other shapes to predetermined lengths. In such applications the blowpipe may be manually guided across the work during the cutting operation, or it may be caused to traverse the work by means of a suitable apparatus either automatically or semi-automatically controlled.

Prior apparatus adapted for severing round bars and comprising a gas-cutting blowpipe and means automatically or semi-automatically controlled to impart arcuate motion to said blowpipe across the bar, in general, have relied on a method of cutting in which the position of the blowpipe, with respect to the vertical axis of the work, remains substantially parallel as the blowpipe traverses the work. In cutting operations employing such a method, it is desirable to decrease the rate at which the blowpipe traverses the work as the thickness of the work increases, in order to compensate for the difference in degree of oxidation and cutting action which occurs between the gases at the upper or entrant portion of the kerf and those at the lower or emergent portion and which causes the bottom of the kerf to proceed at a slower rate than the top.

According to the invention the time required for making a cut is substantially reduced by employing more than one blowpipe simultaneously, for example, two blowpipes may be employed for starting the cut at each lateral edge of the body. The movement of the two blowpipes toward each other from each edge is so controlled that when the blowpipes approach each other near the center of the body, one of the blowpipes is caused to stop cutting and reverse its movement and the other blowpipe completes the kerf.

A principal object of the present invention is to provide a method of and an appartus for decreasing the time required for thermochemically severing ferrous metal bodies, particularly bodies of similar width and thickness.

Other objects of the invention are to provide a method of thermochemically severing metal bars, and the like, whereby the cutting action is advanced at the most efficient rate in each portion of the kerf; to provide a method whereby a plurality of blowpipes may operate simultaneously for producing a single kerf; to provide apparatus adapted for practicing such method; to provide such apparatus comprising means for causing a gas-cutting blowpipe to traverse the article to be cut, and means for varying the angular position of the blowpipe during its travel; to provide such apparatus including means for reversing the direction of travel of a cutting blowpipe when said blowpipe reaches a predetermined point in its travel; and to provide an apparatus whereby the cutting operation may be automatically or semi-automatically controlled.

The manner in which this invention attains these and other objects will be apparent from the following description and the accompanying drawing in which:

Figure 1 is a front elevational view partly in section of a preferred embodiment of the invention; and Figure 2 is a horizontal section taken along line 2—2 of Figure 1.

The present invention is based on a method of blowpipe cutting which comprises heating a portion of the metal stock to its ignition temperature, directing a jet of oxidizing gas onto said heated portion to start a kerf therethrough, progressively moving said jet across the stock, and continuously changing the angle at which said jet strikes the stock during such movement.

In the preferred embodiment of the method and apparatus described herein two cutting units are employed, each propelled during the cutting operation in a common plane, but in opposite directions, toward the vertical axis of the work. In order to remove completely the metal from the center of the cut, one of the cutting units is carried past the vertical axis. To accomplish this, a reversing mechanism is provided which is adapted to reverse the direction of one cutting unit at a predetermined point in its line of travel. Thus, one of the cutting units travels almost to the vertical axis of the work, and then its direction of travel is reversed, while the other cutting unit is carried past the vertical axis to complete the cut.

The invention herein described is particularly adapted for cutting hot billets, the heat of which is sufficient to ignite the preheating and cutting gases without external means. However, a pilot flame may readily be affixed to the apparatus so that the gases will automatically ignite when they are brought into contact with said flame.

Furthermore, the apparatus has been described in connection with the cutting of substantially round billets or bars but it can be seen that the invention is not so limited and may readily be adapted to the cutting of other billet or bar shapes.

Cutting hot billets with two simultaneously operated blowpipes provides further advantages. For example, when cutting hot round billets with one blowpipe, slag will be found to accumulate on the underside during the last half of the cut. This is because the billet is cylindrical in shape and the underside curves upward on the left half of the cut. This upward curvature will cause the molten slag to flow back over the lower edge of the kerf. Such accumulation of slag on either end of a billet will interfere with the proper further working of the billet. Very little slag has been found to accumulate on the first half of the cut due to the downward slope. Therefore, by using two blowpipes and starting the cuts diametrically opposite each other, each cut will progress toward the center of the billet and the slag accumulation on the bottom will be negligible.

An embodiment of apparatus, according to the invention, adapted particularly for cutting bars and billets of similar width and thickness such as round, polygonal or square bars supported in the diamond position, is shown in the drawing positioned to cut a round bar W of substantially the largest diameter to be cut. At W' is indicated in broken lines relatively one of the smallest round or square bars that can be cut by the apparatus.

The billets W may be supported horizontally by any suitable means. As shown, the billet W is carried by the rolls R of a conveyor which may be of the customary type employed in steel mills in which every other roll is motor driven. A V-block 60 vertically straddles the billet W and serves as a centralizing or aligning device for two blowpipes B and B'. It often happens that the billets are not sufficiently straight to cause them to come to rest with their axis directly over the center line of the conveyor, and in such case the V-block 60 will align the blowpipes with the billet irrespective of the position of the billet on the roll R. A tubular stem 61 secured to the center of the V-block 60 extends upward and is slidably mounted within a sleeve 62. The upper end of a spring 63 which surrounds the middle portion of the sleeve 62 rests against a collar 64 secured to the sleeve. The lower end of the spring 63 acts against projections 65 of the stem 61 which projections extend through longitudinal slots 66 in the sleeve 62. It will be seen that the downward force of spring 63 will act to hold the V-block firmly in contact with the surface of the billet W. The upper end of sleeve 62 is provided with diametrically opposite ears 67 and 67' to which are pivotally secured two blowpipe supporting arms 68 and 68'. The pivot points 23 and 24 for the blowpipe arms 68 and 68' are located a substantial distance on either side of the center line of the sleeve 62. This offset is provided to improve the operation of the unit when the two blowpipes approach each other at the completion of a cut. A pair of blowpipe holders 69 and 69' are adjustably mounted in pivots 70 and 70' at the lower ends of blowpipe supporting arms 68 and 68'. Since both blowpipe holders are alike, only one will be described. Within the holder 69 is disposed an inner sleeve 71 that surrounds the blowpipe B and which is held in position in the sleeve 71 by a clamp 72. To the sleeve 71 is secured an annular worm gear 73 that meshes with a worm 74 secured to the transverse stem of a handwheel 76 rotatably supported by a bearing projection 75 of the blowpipe holder 69. Thus, the rotation of the handwheel 76 will rotate the worm 74 and turn the gear 73, sleeve 71, and blowpipe B.

The cutting nozzle N is bent downwardly at an angle to the center line of the blowpipe. The nozzle is so formed that when the two cuts meet in the center of the billet, the cutting nozzles can approach one another more closely so that the uncut portion 25 that tends to remain in the middle of the work is reduced to a minimum. This uncut portion can be removed as will be hereinafter described. Since the cutting nozzles are bent, the means for rotating the blowpipe just described is employed for adjusting the position of the nozzle after it is clamped to the end of the blowpipe. It is desirable that the two cutting jets should lie in a common plane perpendicular to the longitudinal centerline of the billet, otherwise there may be an objectionable nick produced when the two cuts meet in the center of the billet. By turning the handwheel 76 minute radial adjustments of the cutting jets can easily be made even while the cutting operation is in progress. No lateral adjustment of the blowpipes is provided since there should not be an occasion to alter the relation between the blowpipe nozzle and the work once the proper setting has been established.

A small knurled roller 77 is provided to roll in contact with the surface of the billet W to maintain a uniform relation between the cutting nozzle N and the work surface. The roller 77 is mounted at the end of an arm 78 that extends downwardly from the blowpipe holder 69. A similar roller 77' and arm 78' are provided for the blowpipe B'. Instead of a roller a skid could be employed provided that the radial center of the skid is no further away from the work surface than the axis of the roller which should be relatively small. Two inwardly directed projections 79 and 79' are provided on the blowpipe arms 68 and 68', respectively, and which are positioned to contact one another at the finish of the cut, i. e., projection 79 is disposed so that its contact with projection 79' will prevent the cutting nozzles N and N' from coming in contact with each other at the finish of the cut.

To the upper end of the sleeve 62 is secured a square rack 80 having teeth along one side which mesh with a pinion 81 driven by an electric motor M1 through a variable-speed drive 82 and a worm-gear speed-reduction unit 83. The rack 80 extends vertically and is positioned to one side of the center line of the sleeve 62 which offset is to improve the balance of the mechanism which swings about the axial center of the pinion 81. A guide or enclosure 84 surrounds and slidably supports the rack 80 and is pivotally mounted on one side thereof on the horizontal shaft 85 of the reduction unit 83. The guide 84 permits free vertical movement of the rack 80 when it is moved by the pinion 81 and since the guide 84 is pivoted about shaft 85 the entire structure suspended on the rack is free to swing from side to side through a limited arc and thereby can readily align itself with the billet irrespective of the exact position of the billet on the roll table.

The pinion 81 is keyed to the shaft 85. The motor M1, variable-speed reducer 82, and worm-gear drive 83 are mounted together upon the top surface of a carriage 86 which may comprise a rectangular frame and an upper deck or platform having an opening through which the rack 80 passes freely. The carriage is mounted on four flanged wheels 87 and 87'. The wheels 87 and 87' roll upon transverse rails 88 mounted longitudinally upon I-beams 89. To drive the carriage along the rails a motor M2 and a worm-gear speed reducer 90 are provided. The reducer drives the wheels 87 through a chain 91 meshing with a sprocket 92 on the reducer and a sprocket 93 secured to an axle 94 that connects the left-hand wheels 87. The I-beams 89 may be supported in any suitable manner such, for example, as by end frames having lower ends secured to the floor. Flexible gas supply and electric conduits 95 are provided leading from a source of gas supply and electricity to a control box 96 mounted at the right-hand end of the carriage 86 wherein suitable electrically-operated valves control the preheating gas and cutting oxygen. From box 96, three hoses, such as hoses 97', conduct the preheating gases and cutting oxygen to a pair of connection blocks 98 and 98' carried by extensions of the arms 68 and 68'. From connection blocks 98 and 98', flexible metallic tubes, such as tubes 99', conduct the gases to the upper ends of the blowpipe B and B'. The hoses and tubes for the left-hand block 98 are not shown in order to simplify the drawing.

Means for automatically controlling the operations of the apparatus shown in the drawing may also be provided. Thus a limit switch 100 may be mounted on a vertically adjustable slide 101 carried by the guide 84 and have its switch arm 102 operably engaging the upper portion of the rack 80. The position of the switch 100 is to be adjusted according to the work diameter.

Means for controlling the rate of speed of the motor M1 according to the height of the rack 80, and therefore, according to the thickness of the work being cut while the rack 80 is moving upward is also preferably provided. To this end there is provided in the speed reducer 82 a speed-regulating means which has a control shaft 103. The shaft 103 is turned by a chain 104 that meshes with a sprocket 105 secured to the shaft 103. One end of the chain 104 is secured to a tension spring 106 attached to the carriage 86 and the other end of the chain is secured at 107 to the rim of a sprocket 108 secured to the shaft of the reducer 83. When the rack 80 is raised the sprocket 108 rotates clockwise moving point 107 to a horizontal position with respect to the axis of the sprocket 108. During such movement the shaft 103 will be turned clockwise by the chain 104 and spring 106, such movement being arranged to decrease gradually the output speed of the reducer 82. Further movement would gradually increase the speed. When the rack 80 moves downward the reverse action occurs.

While the rack 80 is being lowered from the extreme upward position in which position the point 107 will be at the bottom of sprocket 108, the pinion 81, sprocket 108, and the point 107 will rotate in a counter-clockwise direction, and sprocket 105 will rotate in a clockwise direction thereby reducing the speed of rotation of the shaft 85. When the point 107 has passed above the horizontal level of the axis of the shaft 85, the direction of rotation of the speed-control shaft 103 will be reversed and thereby the rate at which the rack is further lowered will gradually increase. In order to simplify the apparatus, the position of the point 107 of the sprocket 108 has not been made adjustable according to the size of the billet. Therefore, when cutting the smaller diameter billets, the rate of upward travel would continue to decrease until the blowpipes pass the finishing position of the largest billet.

The diameters of sprockets 105 and 108 are chosen so that the rate at which the blowpipes are raised will be approximately in proportion to the thickness of the metal being cut. When cutting bars of the larger diameters, the rack 80 is raised higher and therefore the lifting speed is reduced to a greater extent. Because of the curvature of the work, the depth of the cut does not vary in a straight line proportion with the vertical movement of the rack whereas the variable speed mechanism, as above described, will decrease the speed of upward travel of the blowpipes substantially in direct proportion to their height. The discrepancy between the reduction of speed and the rate of increase of thickness, however, is not especially disadvantageous because the cutting range with a given size nozzle and a given head pressure is relatively wide so that the cutting efficiency is substantially unaffected. Furthermore, the greatest change in thickness occurs at the beginning of the cut at which time the vertical movement is quickest.

A second limit switch 109 is secured on the top of the carriage 86 and located so that its switch arm 110 is positioned to engage the top of the stem 61 when the rack 80 reaches its upper limiting position.

A third limit switch 111 is mounted on the side of the arm 68 and has a switch arm 112 connected by a rod 113 with one arm of a bell crank 114 pivoted on the arm 68 and having its other arm positioned to be contacted by the projection 79' when the arms 68 and 68' come together.

Two other limit switches 115 and 116 are also provided and are secured to the inside of the rearmost beam 89 in such a position that the switch arms 117 and 118 make contact at the desired times with a cam 119 that depends from the underside of the carriage 86. The switches 115 and 116 control the motor M2 to position the carriage 86.

The operation of the machine shown is effected as follows: Assuming that the suspended blowpipe structure is in the raised position and several inches above the billet W, a billet is moved along the conveyor until the place to be cut is directly under the blowpipes B and B'. To start the cutting operation, the motor M1 is energized to rotate the pinion 81 through the speed reducers 82 and 83 in a counter-clockwise direction so that the rack 80 will move downward. The limit switch 100 is positioned vertically so that its contact finger 102 will turn clockwise when the end of the rack 80 passes the switch. The arm 102 closes an electrical circuit through a suitable electrical control to reverse the rotation of the motor M1, and also to turn on the preheating gases and cutting oxygen for each blowpipe. The preheating flames will heat portions on each side of the billet to an ignition temperature relatively quite rapidly if the billet is at a highly heated rolling temperature.

The electrical control is preferably arranged so that the preheating flames burn for a sufficient period of time to raise the surface to an ignition temperature before the oxygen stream is applied and the motor M1 started. As the rack 80 moves upward the blowpipes B and B' traverse the billet surface and approach toward each other. The rate of movement is gradually reduced during the cutting so that the blowpipes will move at a slower rate when cutting the thickest part of the billet. When the blowpipes approach each other the projection 79 will contact with the projection 79' and press against the downwardly extending arm of the bell crank 114 which will operate the limit switch 111 and close an electric circuit that operates the motor control to stop the motor M1, and turn off the gases flowing to the blowpipe B' and start the motor M2 in operation. Operation of the motor M2 will cause the carriage 86 to move toward the right. As the carriage 86 moves, the V-block 69 will remain in contact with the surface of the billet and the suspended structure will be tilted sufficiently to cause the blowpipe B to cut completely through the remaining metal 25 at the center of the billet. The carriage 86 continues moving toward the right until the arm 118 of the limit switch 116 contacts with the cam 119. The movement of the arm 118 closes an electric circuit that operates suitable relays and the motor control which will reverse the direction of rotation of the motor M2; stop the flow of gases to the blowpipe B and start the motor M1 to operate in a direction that will turn the sprocket 81 clockwise. The carriage 86 continues moving to the left until the arm 117 of the limit switch 115 contacts with the cam 119. The switch 115 then operates the motor control to stop the motor M2. The motor M1 continues to operate until the rack 80 has been raised a sufficient distance to cause the upper end of the stem 61 to contact the arm 110 of the limit switch 109, the operation of which causes the motor control to stop the motor M1. When the blowpipe supporting mechanism is raised away from the billet, the operator controlling the roll table then causes the billet to continue along the roll table.

When square billets are cut, the rollers R are preferably shaped to support the billets in the diamond position with a longitudinal corner upward. The V-block 69 then preferably engages only the two outer corners to permit angular swinging of the blowpipe support. The blowpipes will start cutting at the outer corners and move along the two upper sides toward the upper corner, the operation of the apparatus being substantially the same as when cutting round stock.

What is claimed is:

1. A method of cutting elongated metal stock which comprises simultaneously directing at least two streams of oxidizing gas generally downwardly against surface portions on opposite sides of said stock to form kerfs therethrough, the metal to which said streams are applied being at an ignition temperature; progressively advancing said streams at substantially the same rate toward each other in a plane transverse to the longitudinal axis of said stock; and during the cutting, changing the angular relation between the axes of said streams to cause said streams to converge downwardly by moving said streams about pivots in said plane over the stock on opposite sides thereof, while maintaining the degree of such angular relation less than a straight angle; interrupting the advance of and simultaneously shutting off one of said streams; continuing the advance of the other of said streams until the kerf produced thereby meets the kerf made by the stream which was interrupted at the bottom of the stock; and further advancing said other stream while decreasing the angle thereof with respect to the breast of the kerf made by the stream which was interrupted until the kerfs meet at the top of the stock and thereby complete the severing thereof.

2. A method of cutting elongated metal stock which comprises simultaneously directing from respective orifices at least two streams of oxidizing gas generally downwardly against surface portions on opposite sides of said stock to form kerfs therethrough, the metal to which the streams are applied being at an ignition temperature; progressively advancing said streams at substantially the same rate toward each other in a plane transverse to the longitudinal axis of said stock while maintaining the orifice of each stream spaced from the surface of the stock by a stock rider engaging the surface of said stock adjacent the cutting point of each stream respectively, and during the cutting, changing the angular relation between the axes of said streams to cause said streams to converge downwardly, by moving said streams about pivots in said plane over said stock and on opposite sides thereof, while maintaining the degree of such angular relation less than a straight angle; interrupting the advance of one of said streams in the course of said cutting in response to arrival of said stream at a position of predetermined spacing from each other; simultaneously automatically shutting off, in response to the same arrival of both of said streams at said position of predetermined spacing, that same one of said streams of which the advance was interrupted; continuing the advance of the other of said streams until the kerf produced thereby meets the kerf made by the stream which was interrupted at the bottom of the stock; and further advancing said other stream until the kerfs meet at the top of the stock and thereby complete the severing thereof.

3. A method of cutting metal stock which comprises simultaneously directing at least two streams of oxidizing gas against surface portions on opposite sides of said stock to form kerfs therethrough, the metal to which said streams are applied being at an ignition temperature; progressively advancing said streams toward each other in a plane transverse to the longitudinal axis of said stock; interrupting the advance of and simultaneously automatically shutting off one of said streams; continuing the advance of the other of said streams until the kerf produced thereby meets the kerf made by the stream which was interrupted at the bottom of the stock; continuing the advance of the other of said streams until the meeting point of said kerfs rises to the top of said stock and cuts completely through the remaining metal at the center of the stock; and during the cutting, changing the angular relation between the axes of said streams to cause said streams to converge downwardly, by moving said streams about pivots in said plane over said stock and on opposite sides thereof, while maintaining the degree of such angular relation less than a straight angle.

4. A method of thermochemically cutting metal stock which comprises simultaneously directing at least two streams of oxidizing gas against surface portions on opposite sides of said stock to form kerfs therethrough, the metal to which said streams are applied being at an ignition temperature; progressively advancing said streams toward each other in a plane transverse to the longitudinal axis of said stock until the kerfs produced by said streams substantially meet; and during the cutting, continuously changing the angular relation between the axes of said streams to cause said streams to converge downwardly, by moving said streams about pivots in said plane over said stock and on opposite sides thereof, while maintaining the degree of such angular relation less than a right angle.

5. In apparatus for cutting elongated metal stock, said apparatus having a track extending transversely of and above said stock, and power actuated carriage means movable along said track, the improvement which comprises blowpipe mechanism depending from said carriage means including pivoted blowpipe supporting arms and blowpipes respectively mounted on said arms and adapted to direct streams of oxidizing gas against opposite edges of said stock, said arms each having means engaging the stock for maintaining said blowpipes at a predetermined distance from said stock, means for progressively advancing said arms toward each other with said blowpipes in downwardly converging relation including means for interrupting the advance of one of said arms at a predetermined point, means for automatically shutting off the oxidizing gas stream of said blowpipe at said point, means for continuing the advance of the other of said arms until the kerfs produced meet at the bottom of the stock, and means for further advancing said other arm until the kerfs meet at the top of the stock and complete the severing thereof.

6. In apparatus for operating upon opposite sides of elongated metal stock in which a track is adapted to be disposed adjacent to the stock to be operated upon and a carriage is mounted to travel along said track, the improvement which comprises a blowpipe carrier supported by and depending from said carriage, a pair of blowpipe supporting means pivotally mounted on and depending from said carrier, blowpipes carried by said blowpipe supporting means and directed thereby for applying gas jets against the sides of the stock, V-groove means depending from said blowpipe carrier adapted to engage portions of the surface of said stock for centering said carrier with respect to the so engaged portions, means for raising and lowering said blowpipe carrier, and means engaging said blowpipe supporting means for moving them about their pivotal mounting means to cause said blowpipes to move transversely with respect to the surface of said stock toward and away from each other.

7. In a blowpipe apparatus for cutting elongated metal stock, in which a track is adapted to be disposed in a plane above and parallel to the stock to be operated upon; and carriage means are mounted to travel along said track; the improvement which comprises blowpipe carrier arms pivotally supported by said carriage means and depending therefrom; blowpipes carried by said blowpipe carrier arms adapted to direct oxidizing gas streams simultaneously against surface portions on opposite sides of said stock to produce kerfs therein; means on said blowpipe carrier arms adapted to engage the surface of said stock for maintaining said blowpipes at a predetermined distance from the surface of said stock; means for raising and lowering said blowpipe carrier arms about their pivots on said carriage means; means for causing said blowpipe carrier arms to move said blowpipes along the surface of said stock toward and away from each other in a plane transverse to the longitudinal axis of said stock; means on one of said arms adapted to engage an abutment moving with the other of said arms for interrupting the advance of one of said blowpipes at a predetermined point; means for automatically shutting off the oxidizing gas stream of said blowpipe at said point; and means for continuing the advance of the other of said blowpipes at least until the kerfs produced meet.

8. In a blowpipe apparatus for operating upon elongated metal stock having a track adapted to be disposed transversely of the stock to be operated upon; and a carriage movably mounted to travel along said track for supporting blowpipes for movement transversely of said stock the improvement which comprises; V-block means depending from said carriage and arranged to engage the surface of said stock for positioning said blowpipes with respect to the surface of said stock; a blowpipe carrier pivotally supported by said carriage; a pair of depending arms pivotally mounted on said carrier; blowpipes mounted at the lower ends of said arms for applying gas streams against the sides of said stock; means for maintaining said blowpipes at a predetermined distance from the surface of said stock; and means for raising and lowering said blowpipe carrier to cause said blowpipes to move transversely of the surface of said stock toward and away from each other.

9. In a blowpipe apparatus for operating upon elongated metal stock, a blowpipe carrier; a pair of depending arms pivotally mounted on said carrier; the pivotal mountings of said arms being horizontally spaced apart and disposed on the sides of the carrier which are opposite their respective arms; blowpipes mounted at the lower ends of said arms for applying gas streams against the sides of said stock; and means for raising and lowering said blowpipe carrier to cause said blowpipes to move transversely of the length of said stock toward and away from each other.

10. In a blowpipe apparatus for operating upon elongated metal stock, a blowpipe carrier; a pair of depending arms pivotally mounted on said carrier; blowpipes mounted at the lower ends of said arms for applying gas streams against the sides of said stock; means for raising and lowering said blowpipe carrier; and means to cause said blowpipes to move transversely of the length of said stock toward and away from each other; said blowpipes being provided with nozzles having downwardly directed orifices arranged at an angle to the main axes of said blowpipes to allow said nozzles to closely approach each other.

11. In a blowpipe apparatus for cutting elongated metal stock, the combination of a frame having a track adapted to be disposed adjacent the stock to be cut; a carriage mounted to travel along said track; blowpipe carrier means pivotally supported by said carriage; a pair of blowpipes pivoted on said carrier means in depending relation and directed for applying cutting gas streams against opposite sides of said stock to form coplanar kerfs therein, said carrier being swingable in the plane of said kerfs about its pivot, V-shaped means connected with said carrier means for movement therewith transversely of said stock and adapted to engage portions of the surface of said stock on opposite sides thereof for centering said carrier means with respect to the so engaged portions of the surface of said stock to be cut; means for raising and lowering said blowpipe carrier means; and means for moving said blowpipes transversely with respect to the surface of said stock toward and away from each other.

12. In a blowpipe apparatus for cutting elongated metal stock, blowpipe carrier means, blowpipes pivotally mounted on said blowpipe carrier means and directed for applying cutting gas streams against opposite sides of said stock to form coplanar kerfs therein; mechanism for advancing said blowpipes toward each other in a plane transverse to the longitudinal axis of said stock, said mechanism including means for continuously changing the angular relation between said blowpipes during such transverse movement; said mechanism also including means for interrupting the advance of one of said blowpipes while continuing the advance of the other before the kerfs produced can meet.

13. A machine for cutting elongated metal stock, comprising in combination, a track extending transversely above said stock, a carriage movable along said track, a blowpipe, mechanism on said carriage for supporting and propelling said blowpipe, means for mounting said blowpipe mechanism on said carriage and cooperating with said blowpipe mechanism for maintaining said blowpipe in the plane of the projected cut at all times during the movement of the blowpipe, an abutment on said carriage and depending below the top of said stock in position to contact with the side of the body to be cut, said blowpipe mechanism including a blowpipe holder moved into operative position to start a cut at the edge of the metal body when the abutment is against the side of the body, means for moving said blowpipe mechanism substantially in said plane toward said stock into operative position and away from said stock into inoperative position, means responsive to arrival of said mechanism into said operative position for turning on the supply of at least one of the gases to said blowpipe, and means for actuating said blowpipe mechanism to advance said blowpipe to form a kerf in the stock.

LLOYD W. YOUNG.

REFERENCES CITED

The following references are of record in the file of this patent:

UNITED STATES PATENTS

| Number | Name | Date |
|---|---|---|
| 1,096,095 | Bucknam | May 12, 1914 |
| 1,585,893 | Coberly | May 25, 1926 |
| 1,687,001 | Bishop | Oct. 9, 1928 |
| 1,698,173 | Royer | Jan. 8, 1929 |
| 1,825,606 | Schmidt | Sept. 29, 1931 |
| 1,861,923 | Jones | June 7, 1932 |
| 1,885,107 | Brown | Nov. 1, 1932 |
| 1,921,888 | Schmidt | Aug. 8, 1933 |
| 1,923,778 | Douglass | Aug. 22, 1933 |
| 2,017,430 | Anderson | Oct. 15, 1935 |
| 2,067,549 | Sykes | Jan. 12, 1937 |
| 2,143,969 | Biggert, Jr. | Jan. 17, 1939 |
| 2,184,562 | Rockefeller | Dec. 26, 1939 |
| 2,283,346 | Bucknam et al. | May 19, 1942 |
| 2,345,314 | Anderson | Mar. 28, 1944 |
| 2,345,688 | Smith | Apr. 4, 1944 |
| 2,410,134 | Stevenson et al. | Oct. 29, 1946 |

FOREIGN PATENTS

| Number | Country | Date |
|---|---|---|
| 6,215 | France | July 13, 1906 |
| | (3d addition to 349,132) | |
| 438,940 | Great Britain | Nov. 26, 1935 |
| 568,934 | Germany | Jan. 26, 1933 |

OTHER REFERENCES

The Welding Encyclopedia, 8th edition, 1932, pages 308 and 317–320.